No. 697,453. Patented Apr. 15, 1902.
C. DANIEL.
COMBINED TAIL AND REIN GUARD.
(Application filed Feb. 27, 1901.)
(No Model.)
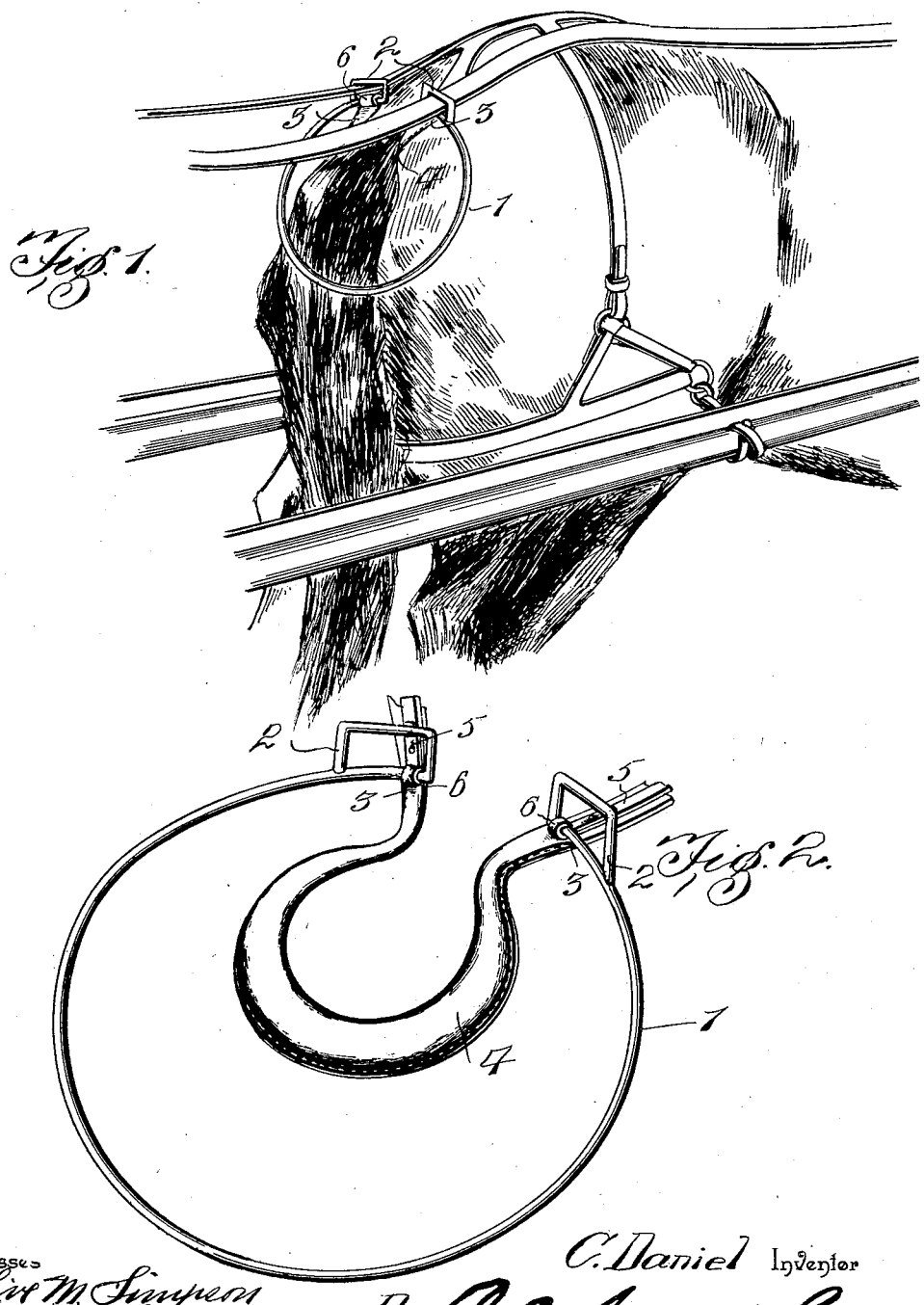

UNITED STATES PATENT OFFICE.

CHARLES DANIEL, OF SYCAMORE, KANSAS.

COMBINED TAIL AND REIN GUARD.

SPECIFICATION forming part of Letters Patent No. 697,453, dated April 15, 1902.

Application filed February 27, 1901. Serial No. 49,101. (No model.)

*To all whom it may concern:*

Be it known that I, CHARLES DANIEL, a citizen of the United States, residing at Sycamore, in the county of Montgomery and State of Kansas, have invented a new and useful Combined Tail and Rein Guard, of which the following is a specification.

This invention relates to a combined tail and rein guard; and the object of the same is to provide a simple and effective device of the class set forth, constructed of a single piece of material and secured to the crupper-terminals, and thereby held at a proper depending angle over the tail of the animal to prevent upward switching or movement of the tail in proximity to the reins above, the forward terminals of the guard being continued into upwardly-projecting loops for passage therethrough of the reins to prevent the latter from falling over the sides of the animal.

The invention consists in the construction and arrangement of the several parts, which will be more fully hereinafter described and claimed.

In the drawings, Figure 1 is a perspective view of the rear portion of a horse, harness, and thills, showing the improved device applied in operative position. Fig. 2 is a detail perspective view of the improved device and the crupper with which it is combined.

Similar numerals of reference are employed to indicate corresponding parts in the views.

The improved device consists of a wire guard-loop 1 of a suitable diameter, having its terminals spaced apart and continued into rectangular upwardly-projecting rein-guiding loop-eyes 2 of such dimensions as to permit the reins freely to move therethrough and be held from dropping over the opposite sides of the animal and catching in parts of the harness. The guard-loop 1, with its loop-eyes 2, as set forth, is combined with and held in constant connected relation to the terminals 3 of a crupper 4, the said terminals having clips 5 with eyes 6, which engage the lower portions of the loop-eyes 2, and by this means the improved device can be applied simultaneously with the application of the harness and also be held at a proper depending angle to bear on the upper portion of the tail of the animal. The guard-loop 1 depends far enough over the tail of the animal as to prevent the latter from moving such part of his anatomy in an upward direction, and thereby permit the reins to remain undisturbed.

The improved device is simple in its construction and can be readily applied without disorganizing the parts of the harness and when once applied always remains in operative position. The expense of manufacture is also reduced to a minimum.

The crupper 4 by the arrangement of the loop 1 as set forth is projected downwardly into the confines of said loop, and by this means the disposition of the crupper in proper applied position under the tail will simultaneously cause the said loop to be positioned as desired over the tail, the size of the loop and the projection of the crupper therein being primarily predetermined to effect the desired application, as set forth. Moreover, the loop will have sufficient yielding movement to permit the one attaching member of the crupper to be readily detached and removed, as usual, and as readily applied and secured. The substantially circular form of the loop 1 gives it an extended lateral extent which will overcome any tendency of the animal to move his tail sidewise outwardly from under the said guard, and the latter always has a close bearing on the tail. It will also be seen that the upper extremities of the loop 1 are engaged by the clips 5 close to the inner vertical members of the loop-eyes 2, and in the event of wear of the clip-eyes 6 the loop 1 will be prevented from shifting in either a right or left direction by the inner vertical or upstanding members of the loop-eyes 2 striking the said eyes 6, and by this means the loop will always be held in the same position with relation to the crupper.

Having thus described my invention, what I claim as new, and desire to secure by Letters Patent, is—

1. The combination with a crupper having its members provided each with a clip, of a combined tail and rein guard substantially circular in form and of greater diameter than the crupper, the terminals of the guard being passed through the clips and bent to present rein-guides that operate to hold the guard associated with the clips.

2. The combination with a crupper provided on the upper side of its terminals with clips, of a tail-guard comprising a piece of wire bent in substantially circular form to include the crupper but of greater diameter than the same, the terminals of the wire being passed through the clips and bent upon themselves to present rectangular rein-guides, the clips being held associated with the rein-guides by the vertically-disposed members thereof, substantially as and for the purpose specified.

In testimony that I claim the foregoing as my own I have hereto affixed my signature in the presence of two witnesses.

CHARLES DANIEL.

Witnesses:
J. C. PARKER,
HOWARD A. SCOTT.